Aug. 18, 1970  H. VERDIER  3,524,490

TIRE CASINGS

Filed Feb. 26, 1968

INVENTOR.
HENRI VERDIER

BY Brumbaugh, Free, Graves & Donohue his ATTORNEYS

United States Patent Office

3,524,490
Patented Aug. 18, 1970

3,524,490
TIRE CASINGS
Henri Verdier, Beauregard-l'Eveque, France, assignor to Compagnie Generale des Etablissements Michelin raison sociale Michelin & Cie, Clermont-Ferrand, Puy-de-Dome, France
Filed Feb. 26, 1968, Ser. No. 708,038
Claims priority, application France, Feb. 27, 1967, 96,698
Int. Cl. B65c 5/00, 15/00
U.S. Cl. 152—362      7 Claims

ABSTRACT OF THE DISCLOSURE

The bead of a tire casing is formed with a heel surface in truncating relation to the bottom and outer bearing surfaces of the bead. The heel surface and at least one of the bottom and outer surfaces are substantially equidistant from the bead wire.

BACKGROUND OF THE INVENTION

The present invention relates to improvements of tire casings and, more particularly, to improvements of the beads of tire casings, especially casings of the type having radial cords.

Tires having a casing which comprises a small number of plies of either metal or textile wires or cords, or, especially, a casing which comprises a single ply or a few plies of wires or cords extending in a radial direction, tend to have very flexible sidewalls. This is true even of large tires, for example tires for trucks having a single carcass ply of radial metal cords. Moreover, tires with a single carcass ply or a small number of carcass plies generally possess only one bead wire in each bead. Actually, it is not necessary to make use of several bead wires per bead unless the tire comprises a large number of carcass plies. Then one may distribute the plies among the bead wires in order to avoid winding too many plies around one bead wire. Thus, even large casings may comprise only a single bead wire per bead if they have only a few carcass plies. Finally, mainly in the case of tires having radial cords, it is customary to use braided bead wires of circular cross section because they are more flexible and less bulky than bead wires formed of superimposed layers of rubberized bead wires forming band side by side in each layer. The former nevertheless serve as well as the latter to support the radial cords.

The combination of these characteristics—a casing comprising a small number of plies having radial cords, a single bead wire in each bead, the bead wires being braided—while in certain respects very advantageous, produces the disadvantage that, in mounting the tire on a rim, the bead may come to rest in such a manner that its outside bottom edge or heel rubs against the bottom of the rim or against the bead seat. If the various parts of the rim, especially the seats of the beads, are within normal tolerances, the inflation pressure pushes the bead towards the edge of the rim and seats it properly. It happens, however, in the case of certain rims, especially rims with inclined bead seats exceeding tolerances or being at the upper limits of the tolerances, that the bead becomes blocked in a slanted position, the outside edge thereof being wedged against the seat and the normal inflation pressure being insufficient to force the bead to a plumb position.

SUMMARY OF THE INVENTION

An object of the present invention is to remedy the shortcomings of conventional tire casings noted above. In particular, an object of the invention is to facilitate the correct positioning of the bead, without otherwise bringing about any problems, such as abnormal wear of the bead or difficulties in manufacture. The foregoing and other objects are attained in accordance with a representative embodiment of the invention by the provision of a tire casing the beads of which are formed with bottom and outer surfaces which are substantially perpendicular with respect to one another and are adapted to rest against the rim. The beads are characterized in that they include a heel surface in truncating relation to the bottom and outer surfaces. The heel surface has a meridian radius of curvature which is sufficiently large to render the distance between the connecting heel surface and the center of the bead wire little different from, and preferably less than or equal to, the distance from the center of the wire to the bottom and outer bearing surfaces. In no case does the distance from the center of the bead wire to the heel surface exceed by more than 10% to 15% the distance from the center of the wire to the bearing surfaces.

The outer bearing surface is in contact with the edge of the rim, and the bottom bearing surface is in contact with the seat of the bead on the rim. The heel surface has a cross section in a plane containing the axis of the tire casing which is straight-lined in one embodiment and curved in another. When it is straight-lined, it is preferably inclined approximately 45° with respect to the axis of the tire casing. In this embodiment, the entire heel surface has the shape of a frustum of a cone. When the heel surface is curved, it preferably turns its concavity towards the bead wire. Preferably, the center of the curvature of the heel surface is located immediately next to the center of the bead wire or coincides with it.

By thus trimming the heel of the bead, one reduces the butting effect that has long prevented proper seating of the bead. Owing to the presence of a large hollow space between the bead and the rim, the seating of the bead is facilitated, especially if the seat of the bead has a diameter or profile beyond tolerances and forces a radial compression of the bead. Indeed, such bead can to some extent expand laterally into the cavity between the bead and the rim on the side towards which the inflation pressure displaces it.

In one embodiment of the invention, the bead wire is placed off center in order to position it at a greater distance from the bottom surface of the bead than from the outer surface of the bead. This feature, when present, is in combination with the truncating heel surface described above.

BRIEF DESCRIPTION OF THE DRAWING

An understanding of additional respects of the invention may be gained from a consideration of the following detailed descriptions of several representative embodiments thereof, taken in conjunction with the figures of the attached drawing, in which.

DESCRIPTION OF THE PREFERRED EMBODIMENTS

Figure 1:
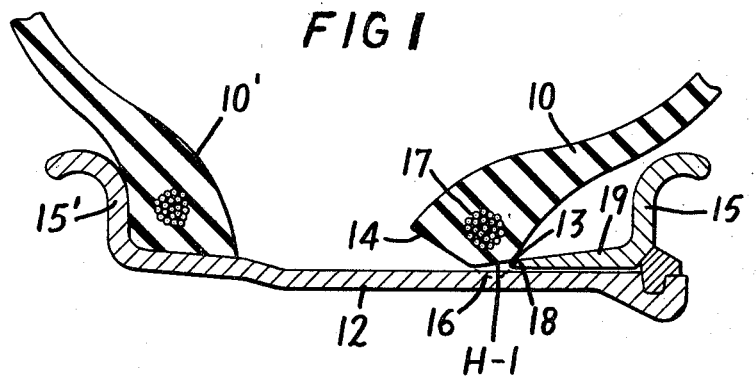
FIG. 1 is a fragmentary cross section in a plane containing the axis of a tire casing of a tire casing bead in accordance with the invention, the tire casing being shown in a first stage of its mounting on a conventional rim with a removable edge.

For clarity, the wire reinforcing each bead of the tire casing has been shown in FIGS. 1–4 of the drawing, but certain other elements customarily present in this part of the tire have been omitted.

In FIG. 1, there is shown the slanted position one of the beads 10 of the tire casing may initially assume on mounting on its rim 12. The outside edge 13 of the bead 10 rests on the rim 12, while normally the bottom surface 14 of the bead 10 should rest thereon. As the inflation pressure increases in the tire casing, the bead 10 is pushed towards a removable ring 15 of the rim 12. In case of a conventional tire, the heel or outside bottom edge of the bead of which has the contour 16 shown in dashes, the strong radial compression of the elastic material between the bead wire 17 and the surface 16 tends to prevent the shifting of the bead 10 towards the ring 15. The situation is further aggravated by the obstacle created by the edge 18 of the conical part 19 of the ring 15.

Figure 2:
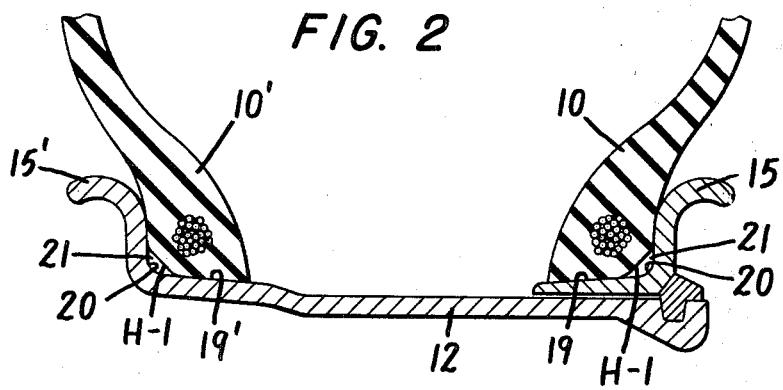
FIG. 2 is a view similar to FIG. 1 but showing the bead at the final stage of its mounting on the rim.

This difficulty of seating of the bead is remedied in accordance with the invention by the provision of a heel surface H–1. FIG. 2 shows the two beads 10 and 10' mounted on their respective seats 19 and 19'. As may be seen, between each of the heels H–1 and the rounded part 20 connecting the seats 19 and 19' to the removable edge 15 and the fixed edge 15' of the rim 12, there remains an empty space 21. This empty space 21, in which the bead 10 or 10' can expand axially if its radial compression becomes excessive, thus facilitates the proper seating of the beads on their seats and, moreover, the holding of the tire on the rim.

Figure 3:
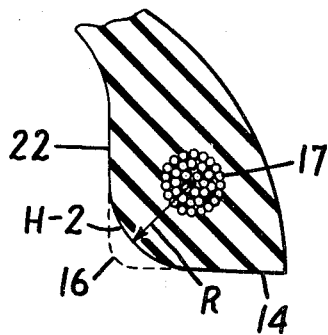
FIG. 3 is a fragmentary view, on a scale larger than that of FIGS. 1 and 2, of a bead in accordance with the invention, the bead having a curved heel surface.

The bead in accordance with the invention shown in FIG. 3, comprises the wire 17 of the braided type with circular cross section. The bead is formed with a curvilinear heel surface H–2 which connects the bottom surface 14 to the outer surface 22 of the bead. The bottom surface 14 and the outer surface 22 constitute the two bearing surfaces of the bead on the rim. The radius R of the curved heel surface H–2 has its center coinciding with that of the bead wire 17 and, in this example, the length of the radius R equals the distance between the center of the bead wire 17 and the bottom surface 14 and also the distance between the center of the bead wire 17 and the outer surface 22. The heel 16 of a conventional bead is shown in dashes. The distance between the heel 16 and the center of the bead wire 17 is considerably greater than the distance between the center of the bead wire 17 and either the bottom surface 14 or the outer surface 22.

Figure 4:
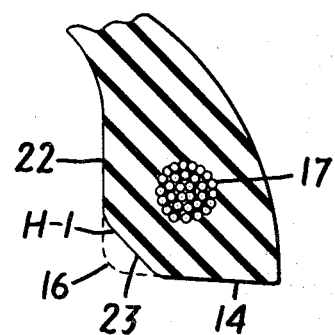
FIG. 4 is a view similar to FIG. 3 showing a bead in accordance with the invention, the bead having a straight-lined heel surface.

In the embodiment of the invention shown in FIG. 4, the heel surface H–1 of the bead is frustoconical and, in a section lying in a plane containing the axis of the tire casing, has a straight-lined part 23 the distance of which to the center of the wire 17, measured perpendicularly to such straight-lined part 23, is approximately 7% shorter than the distance between the said center, on the one hand, and the bottom surface 14 or the outer surface 22, on the other hand. The rectilinear part 23 is inclined at an angle of 45° with respect to the axis of the tire casing. The heel 16 of a classical bead is shown in dashes.

Figure 5:
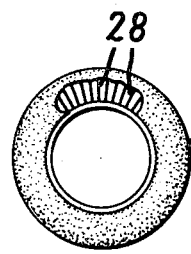
FIG. 5 is a schematic view, partly broken away, of a tire of the type having radial cords in the carcass thereof, in which the present invention has special utility.

FIG. 5 shows a tire casing 27 of the type having radial cords 28 in the carcass thereof. The radial cords 28 extend radially from bead to bead. Because of the great flexibility of the sidewalls of such tires, the present invention has special utility in such tires. It may, however, be used in other tires as well.

Thus, there is provided in accordance with the invention a novel and highly-effective tire casing facilitating correct positioning of the bead. The tire casing of the invention is easily and inexpensively manufactured, and the bead thereof is not subjected to abnormal wear.

Many modifications of the representative embodiments of the invention disclosed herein will readily occur to those skilled in the art. In particular, the distance between the center of the bead wire 17 and the bottom bearing surface 14 of the bead may be different from that between the center of the bead wire 17 and the outer bearing surface 22 of the bead. In such case, the separation between the center of the bead wire 17 and the outer bearing surface 22 is preferably less than that between the center of the bead wire 17 and the bottom bearing surface 14. Many other modifications of the representative embodiments of the invention disclosed herein will readily occur to those skilled in the art and, accordingly, the invention is to be construed as including all the modifications thereof within the scope of the appended claims.

I claim:

1. In a wheel including a rim and a tire casing mounted on said rim, said tire casing having a bead formed with a bottom surface and an outer surface and comprising a bead wire, the improvement in which said bead is formed with a heel surface in truncating relation to said bottom and outer surfaces, said heel surface and at least one of said bottom and outer surfaces being substantially equidistant from said bead wire, and said wheel being free of additional material between said heel surface and said rim.

2. A wheel according to claim 1 in which said heel surface is substantially frustoconical.

3. A wheel according to claim 2 in which the cone of said heel surface forms an angle of substantially 45° with the axis of said casing.

4. A wheel according to claim 1 in which a cross section of said heel surface taken in a plane containing the axis of said casing is a line concave toward said bead wire.

5. A wheel according to claim 4 in which said line substantially describes a portion of a circle centered on said bead wire.

6. A wheel according to claim 1 in which said bead wire is closer to said outer surface than to said bottom surface.

7. A wheel according to claim 1 in which said tire casing comprises radial cords.

References Cited

UNITED STATES PATENTS

| 2,822,017 | 2/1958 | Herzegh | 152—362 |
| 3,130,965 | 4/1964 | Niclas | 152—362 |

GEORGE E. LOWRANCE, Primary Examiner